(12) United States Patent
Schuh et al.

(10) Patent No.: US 11,764,843 B2
(45) Date of Patent: Sep. 19, 2023

(54) ADAPTATION OF BEAMFORMED TRANSMISSION

(71) Applicant: Telefonaktiebolaget LM Ericsson (publ), Stockholm (SE)

(72) Inventors: Ralf Schuh, Lund (SE); Jonas Fridén, Mölndal (SE); Christian Bergljung, Lund (SE); Torbjörn Elfström, Fjärås (SE); Johan Thorebäck, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 39 days.

(21) Appl. No.: 17/413,205

(22) PCT Filed: Dec. 13, 2018

(86) PCT No.: PCT/EP2018/084832
§ 371 (c)(1),
(2) Date: Jun. 11, 2021

(87) PCT Pub. No.: WO2020/119910
PCT Pub. Date: Jun. 18, 2020

(65) Prior Publication Data
US 2022/0069878 A1    Mar. 3, 2022

(51) Int. Cl.
*H04B 7/06* (2006.01)
*H04B 17/10* (2015.01)
*H04B 7/0413* (2017.01)

(52) U.S. Cl.
CPC ......... *H04B 7/0617* (2013.01); *H04B 7/0413* (2013.01); *H04B 17/102* (2015.01)

(58) Field of Classification Search
CPC .. H04B 7/0617; H04B 7/0413; H04B 17/102; H04B 17/18
(Continued)

(56) References Cited

U.S. PATENT DOCUMENTS

2008/0311944 A1\* 12/2008 Hansen .................... G01S 1/44
455/517
2011/0281600 A1    11/2011 Tanaka
(Continued)

FOREIGN PATENT DOCUMENTS

| EP | 3 253 104 A1 | 12/2017 |
|---|---|---|
| WO | 2012/158045 A2 | 11/2012 |
| WO | 2017/198293 A1 | 11/2017 |

OTHER PUBLICATIONS

International Search Report and Written Opinion issued in International Application No. PCT/EP2018/084832 dated Aug. 7, 2019 (11 pages).

(Continued)

*Primary Examiner* — Fitwi Y Hailegiorgis
(74) *Attorney, Agent, or Firm* — Rothwell, Figg, Ernst & Manbeck, P.C.

(57) ABSTRACT

There is provided mechanisms for adapting beamformed transmission from a base station. A method is performed by a control node. The control node is configured to control the beamformed transmission. The method comprises obtaining a first piece of information indicative of distance to, and direction towards, a radio communication site relative the base station. The method comprises obtaining a second piece of information indicative of operating radio frequency band of the radio communication site. The method comprises adapting the beamformed transmission so as to keep emission from the base station in the direction towards the radio communication site that contributes within the operating radio frequency band of the radio communication site within a prescribed limit.

19 Claims, 7 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2017/0366981 | A1 | 12/2017 | Takano |
| 2018/0262918 | A1* | 9/2018 | Zhao .................... H04W 16/28 |
| 2019/0342057 | A1 | 11/2019 | Rico Alvarino et al. |
| 2022/0069878 | A1 | 3/2022 | Schuh et al. |

OTHER PUBLICATIONS

ECC Report 281, "Analysis of the suitability of the regulatory technical conditions for 5G MFCN operation in the 3400-3800 MHz band", CEPT, Jul. 2018 (99 pages).

ECC Decision (05)05, "Harmonised utilization of spectrum for Mobile/Fixed Communications Networks (MFCN) operating within the band 2500-2690 MHz1", Jul. 2019 (21 pages).

OPCOM, "Notice of coordination procedure required under spectrum access licences for the 2.6 GHz band Coordination with aeronautical radionavigation radar in the 2.7 GHz band", Mar. 2013 (12 pages).

OFCOM, "Protected Radar list", Jan. 2021 (6 pages).

Ericsson, "Background to systematic correction factor for TRP", 3GPP TSG-RAN4 Meeting 88, R4-1810911, Gothenburg, Sweden, Aug. 2018 (5 pages).

International Search Report and Written Opinion dated Oct. 30, 2020 in International Application No. PCT/EP2020/052931 (14 pages).

Nokia et al., "Discussion on NR remote interference mitigation schemes", R1-1813466, 3GPP TSG-RAN WG1 Meeting #95, Spokane, WA, USA, Nov. 12-16, 2018 (4 pages).

ECC Recommendation (15)01, "Cross-border coordination for mobile / fixed communications networks (MFCN) in the frequency bands: 694-790 MHz, 1427-1518 MHz, 3400-3800 MHz", latest amendment Feb. 14, 2020 (30 pages).

ECC Decision (11)06, "Harmonised frequency arrangements and least restrictive technical conditions (LRTC) for mobile/fixed communications networks (MFCN) operating in the band 3400-3800 MHz", CEPT, Approved Dec. 9, 2011, Amended Oct. 26, 2018 (17 pages).

Arcep, Document Submitted for Public Consultation, www.arcep.fr/uploads/tx_gspublication/modalites-attribution-frequences-26GHz-TDD_avril2019.pdf (Apr. 2019) (machine translation) (36 pages).

ECC Report 296, "National synchronisation regulatory framework options in 3400-3800 MHZ: a toolbox for coexistence of MFCNs in synchronised, unsynchronised and semisynchronised operation in 3400-3800 Mhz", CEPT, Mar. 8, 2019 (137 pages).

ECC Draft Report 307, "Toolbox for the most appropriate synchronisation regulatory framework including coexistence of MFCN in 24.25-27.5 GHz in unsynchronised and semisynchronised mode", CEPT (46 pages).

* cited by examiner

ADAPTATION OF BEAMFORMED TRANSMISSION

CROSS REFERENCE TO RELATED APPLICATIONS

This application is a 35 U.S.C. § 371 National Stage of International Patent Application No. PCT/EP2018/084832, filed Dec. 13, 2018.

TECHNICAL FIELD

Embodiments presented herein relate to a method, a control node, a computer program, and a computer program product for adapting beamformed transmission from a base station.

BACKGROUND

When any radio equipment is to be deployed, regulatory radio frequency (RF) electromagnetic field (EMF) exposure requirements should be accounted for. These RF EMF exposure regulations may typically be based on international guidelines and standards from for example the International Commission on Non-Ionizing Radiation Protection (IC-NIRP) but may take different forms in some countries and regions. An aim of the RF EMF exposure regulations is to secure that the human exposure to RF energy is kept within prescribed limits, which typically have been set with wide safety margins.

As an example, interference to other non-cellular systems from cellular systems is in general an issue and for some radio communication sites providing services based on wireless communication, such as ground radar stations (e.g., radar stations for military, meteorological, or air traffic control applications), fixed Mobile Satellite Stations (MSSs), Radio Astronomy Stations (RASs) maximum interference levels are specified. This could lead to exclusion zones or output power limitations for radio base stations in cellular systems. In order to achieve this, other frequency bands can be used for the transmission from the radio base station in the exclusion zone to still provide network access. Alternatively, a fixed mechanical tilt can be used at the antenna system of the radio base station to lower the transmission radii, etc. Another way to achieve this is to move the radio base station away from the radio communication site suffering from the transmission from the radio base station. Yet another way to achieve this is to provide a physical construction (such as a wall) that blocks the line of sight transmission path from the radio base station to the radio communication site. These are thus examples of mechanisms that can be used for interference avoidance.

However, there is still a need for improved mechanisms for interference avoidance.

SUMMARY

An object of embodiments herein is to provide efficient mechanisms for interference avoidance, especially for base stations using beamformed transmission.

According to a first aspect there is presented a method for adapting beamformed transmission from a base station. The method is performed by a control node. The control node is configured to control the beamformed transmission. The method comprises obtaining a first piece of information indicative of distance to, and direction towards, a radio communication site relative the base station. The method comprises obtaining a second piece of information indicative of operating radio frequency band of the radio communication site. The method comprises adapting the beamformed transmission so as to keep emission from the base station in the direction towards the radio communication site that contributes within the operating radio frequency band of the radio communication site within a prescribed limit.

According to a second aspect there is presented a control node for adapting beamformed transmission from a base station. The control node is configured to control the beamformed transmission. The control node comprises processing circuitry. The processing circuitry is configured to cause the control node to obtain a first piece of information indicative of distance to, and direction towards, a radio communication site relative the base station. The processing circuitry is configured to cause the control node to obtain a second piece of information indicative of operating radio frequency band of the radio communication site. The processing circuitry is configured to cause the control node to adapt the beamformed transmission so as to keep emission from the base station in the direction towards the radio communication site that contributes within the operating radio frequency band of the radio communication site within a prescribed limit.

According to a third aspect there is presented a control node for adapting beamformed transmission from a base station. The control node is configured to control the beamformed transmission. The control node comprises an obtain module configured to obtain a first piece of information indicative of distance to, and direction towards, a radio communication site relative the base station. The control node comprises an obtain module configured to obtain a second piece of information indicative of operating radio frequency band of the radio communication site. The control node comprises an adapt module configured to adapt the beamformed transmission so as to keep emission from the base station in the direction towards the radio communication site that contributes within the operating radio frequency band of the radio communication site within a prescribed limit.

According to a fourth aspect there is presented a computer program for adapting beamformed transmission from a base station, the computer program comprising computer program code which, when run on a control node configured to control the beamformed transmission, causes the control node to perform a method according to the first aspect.

According to a fifth aspect there is presented a computer program product comprising a computer program according to the fourth aspect and a computer readable storage medium on which the computer program is stored. The computer readable storage medium could be a non- transitory computer readable storage medium.

Advantageously this method, these control nodes, this computer program, and this computer program product are efficient mechanisms for interference avoidance, especially for base stations using beamformed transmission.

Advantageously this method, these control nodes, this computer program, and this computer program product allows the interference to be limited with respect to the radio communication site.

Advantageously this method, these control nodes, this computer program, and this computer program product allows the base station to be placed geographically closer to the radio communication site where the emission from the base station needs to be kept within the prescribed limit.

Advantageously this method, these control nodes, this computer program, and this computer program product allows faster deployment of the base station since calculations of possible interference for adapting the beamformed transmission can be efficiently performed.

Advantageously this method, these control nodes, this computer program, and this computer program product allows higher output power to be used by the base station since interference with respect to the radio communication site can be limited.

Advantageously this method, these control nodes, this computer program, and this computer program product are applicable independently of the actual operating frequency used in the network in which the base station is deployed.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
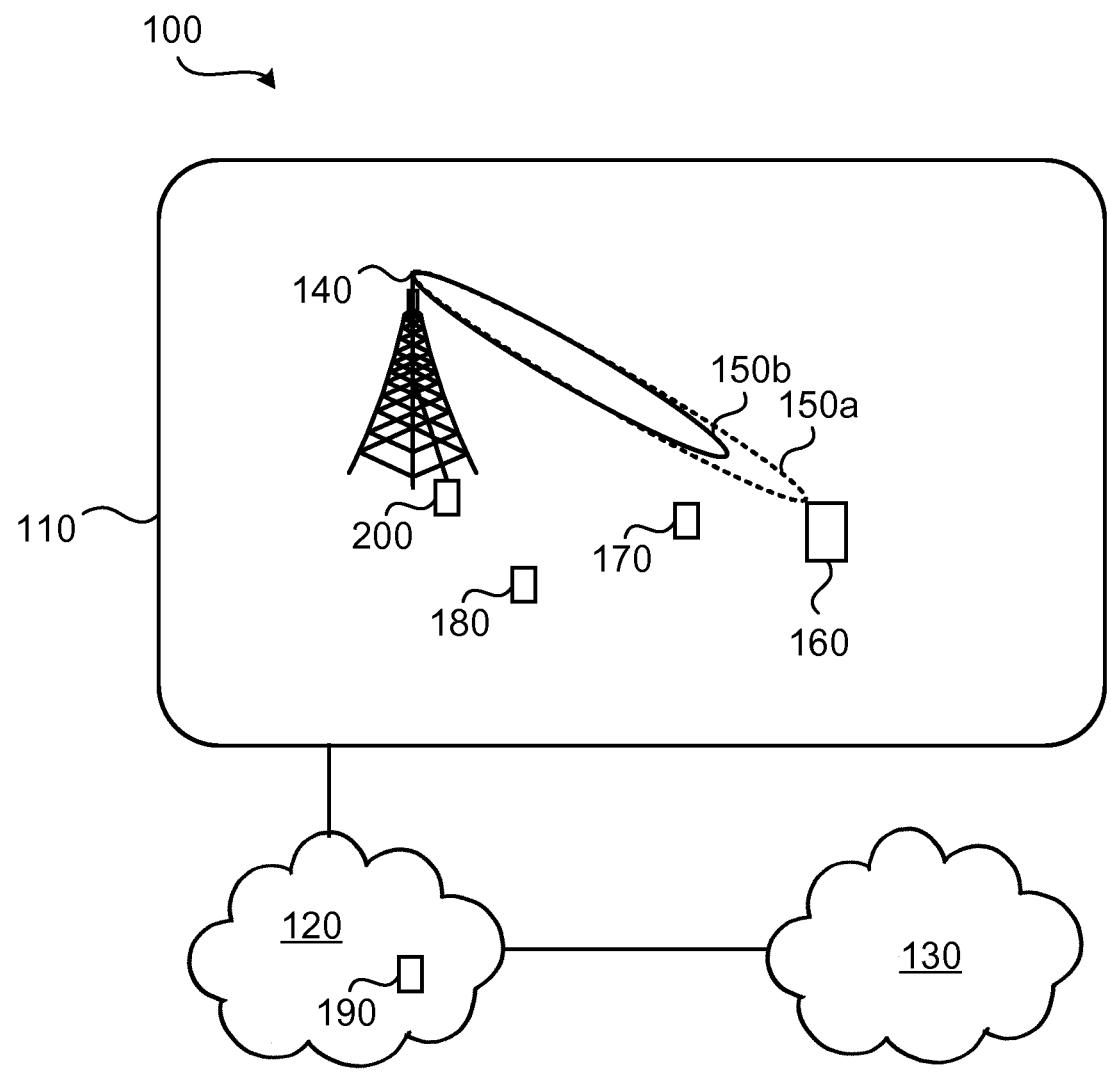
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunication system, a fourth generation (4G) telecommunication system, a fifth (5G) telecommunication system, a WiMAX system, or a WiFi system, and support any 3GPP telecommunications standard, where applicable.

The communications network 100 comprises a control node 200 configured to control a base station 140 that provides network access to at least one terminal device 170 in a radio access network 110. The radio access network 110 is operatively connected to a core network 120. The core network 120 is in turn operatively connected to a packet data service network 130, such as the Internet. The terminal device 170 is thereby enabled to, via the network node, access services of, and exchange data with, the packet data service network 130.

Examples of base stations 140 are radio access network nodes, radio base stations, base transceiver stations, Node Bs, evolved Node Bs, g Node Bs, access points, access nodes, transmission and reception points, and backhaul nodes. Examples of terminal devices 170 are wireless devices, mobile stations, mobile phones, handsets, wireless local loop phones, user equipment (UE), smartphones, laptop computers, tablet computers, and so-called Internet of Things devices.

The communications network 100 further comprises at least one other terminal device 180 in the form of a network equipped sensor or network equipped vehicle, for example in the form of an unmanned aerial vehicle. The at least one other terminal device 180 might have a fixed location (for example when being a sensor) or might be configured to move (for example when being a network equipped vehicle). For simplicity the at least one other terminal device will hereinafter be referred to as either a sensor or a vehicle 180.

The communications network 100 further comprises at least one radio communication site 160. There could be different examples of radio communication sites 160. Non-limiting examples include, but are not limited to, radar stations, radio astronomy stations, and earth satellite ground stations. In general terms, and as will be further disclosed below, the at least one radio communication site 160 represents an entity towards which emission from the base station 140 should be avoided.

As the skilled person understands, the communications network 100 might comprise a plurality of base stations 140 serving a plurality of terminal devices 170. There might further be more than one radio communication site 160, as well as a plurality of sensors/vehicles 180 at different geographical locations in the communications network 100.

The communications network 100 further comprises a database 190. In the illustrative example of FIG. 1 the database 190 is provided in the core network 120 but it could alternatively be provided in the packet data service network 130.

Figure 4:
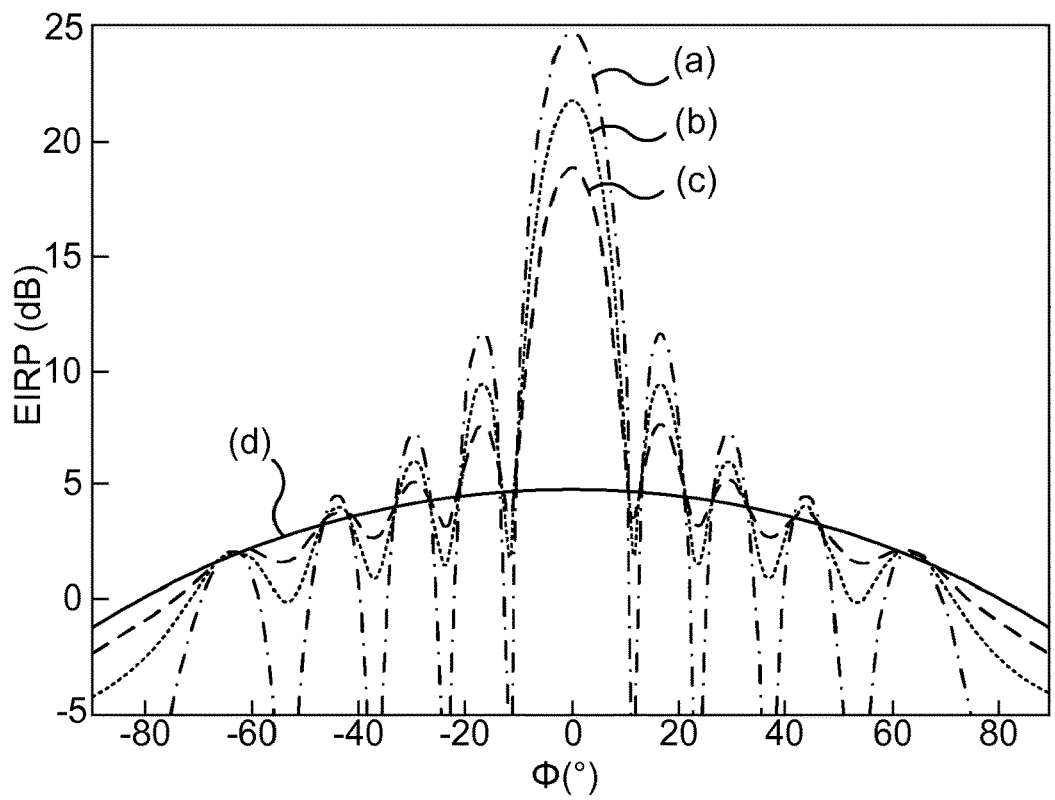
FIGS. 4 and 5 schematically illustrate beam patterns according to embodiments.
Figure 5:
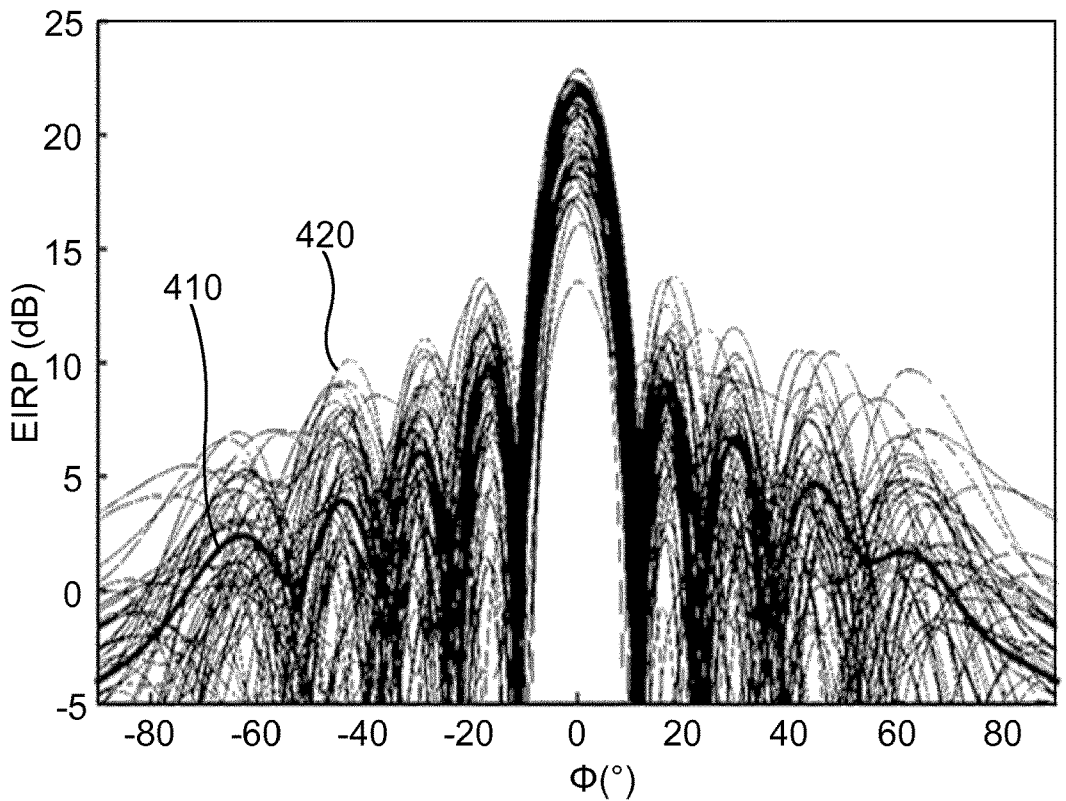

The base station 140 communicates with the at least one terminal device 170 by means of beamformed transmission 150a, 150b. In some aspects the beamformed transmission 150a, 150b is user-specific. In some aspects the base station 140 uses AAS or MIMO in order to accomplish the beamformed transmission 150a, 150b. That is, according to an example, the beamformed transmission 150a, 150b is emitted from an AAS, or a multiple input multiple output (MIMO) antenna system, of the base station 140. It should here be mentioned that FIG. 1 illustrates a simplified version of the beamformed transmission 150a, 150b, not showing any side lobes or eventual back lobes of the beamformed transmission but only the main (forward) lobe. More realistic beam patterns of the beamformed transmission are illustrated in FIGS. 4 and 5 as referenced below.

In the illustrative example of FIG. 1 it could be that the beamformed transmission 150*a* causes interference for the radio communication site 160 and thus requires adaptation (for example, but not limited to, power reduction resulting in beamformed transmission 150*b*) in order to achieve interference avoidance.

Some newly developed radio base stations and other radio equipment are equipped with so-called advanced antenna systems (AAS). These antenna systems increase the capacity and/or coverage compared to traditionally used antenna system by addition of one or more steerable, or dynamically adjustable, antenna arrays. In turn, this enables the simultaneous transmission of parallel data streams between a radio base station on the network side and one or more terminal devices at the user-side by means of so-called multiple-input-multiple-output (MIMO) transmission. Beamformed transmission (and reception) with multiple antennas or antenna elements (such as in AAS) gives in general the advantage over non-beamformed transmission (and reception) that the antenna gain for transmission (and reception) can be controlled towards the served terminal devices.

As noted above, some mechanism that can be used for interference avoidance include 1) to use other frequency bands for the transmission from the radio base station in the exclusion zone to still provide network access, 2) to use a fixed mechanical tilt at the antenna system of the radio base station to lower the transmission radii, etc., 3) to move the radio base station away from the radio communication site suffering from the transmission from the radio base station, 4) to provide a physical construction (such as a wall) that blocks the line of sight transmission path from the radio base station to the radio communication site. Some of these mechanisms are unsuitable for radio base stations with AAS, or have other drawbacks. One reason for this could be that the radio communication site 160 itself does not provide any information to the base station 140 about possible interference experienced by the radio communication site 160 and caused by beamformed transmission from the base station 140. Another reason could be that using a fixed mechanical tilt at the antenna system would as such not prevent beamforming to be made such that beamformed transmission still could occur in the direction towards the radio communication site. Yet another reason could be that if all beamformed transmissions in the sector in which the radio communication site 160 is present then the capacity and performance of the base station 140 would be unnecessarily reduced.

The embodiments disclosed herein therefore relate to mechanisms for adapting beamformed transmission 150*b* from a base station 140 such that emission from the base station 140 does not interfere with the reception and transmission at the radio communication site 160. In order to obtain such mechanisms there is provided a control node 200, a method performed by the control node 200, a computer program product comprising code, for example in the form of a computer program, that when run on a control node 200, causes the control node 200 to perform the method.

Figure 2:
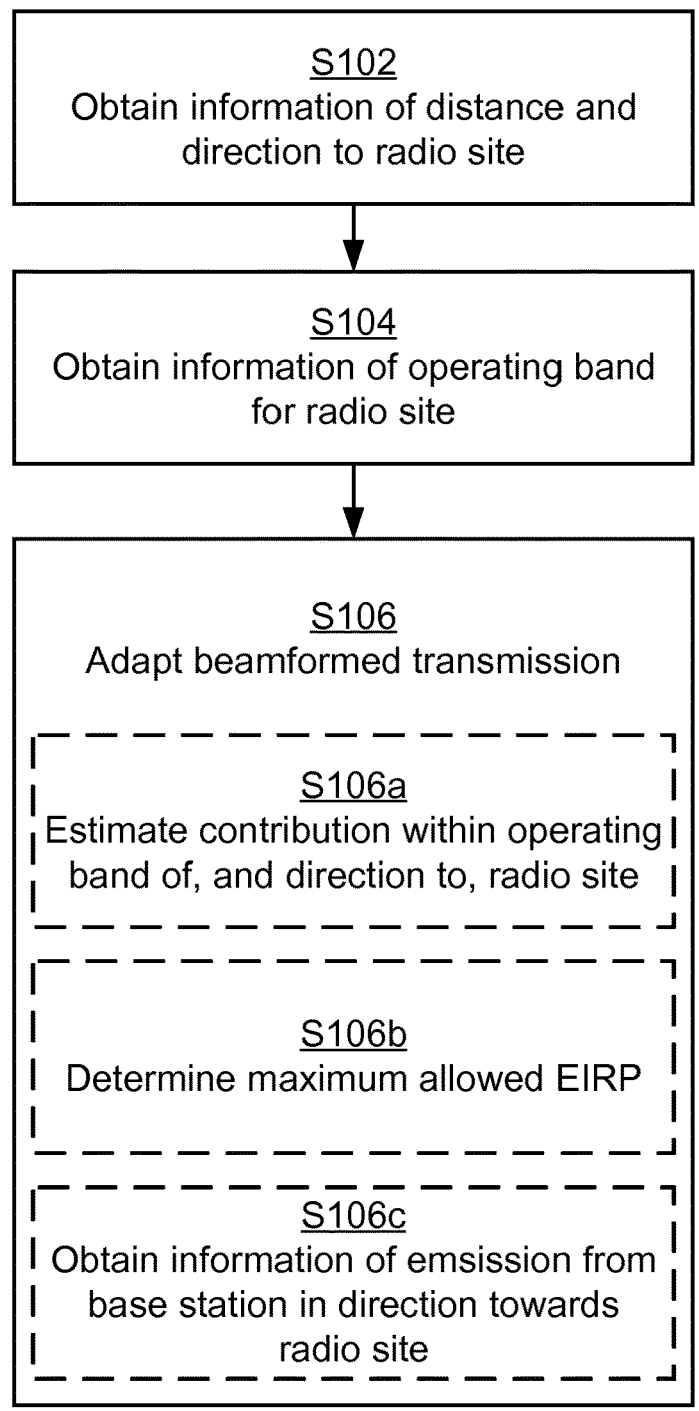
FIGS. 2 and 3 are flowcharts of methods according to embodiments.

FIG. 2 is a flowchart illustrating embodiments of methods for adapting beamformed transmission 150*b* from a base station 140. The methods are performed by the control node 200. The control node 200 is configured to control the beamformed transmission 150*b*. The methods are advantageously provided as computer programs 820.

S102: The control node 200 obtains a first piece of information indicative of distance to, and direction towards, the radio communication site 160 relative the base station 140.

S104: The control node 200 obtains a second piece of information indicative of operating radio frequency band of the radio communication site 160.

S106: The control node 200 adapts the beamformed transmission 150*b* so as to keep emission from the base station 140 in the direction towards the radio communication site 160 that contributes within the operating radio frequency band of the radio communication site 160 within a prescribed limit.

The beamformed transmission 150*b* is thereby adapted to avoid or at least reduce interference to the radio communication site 160.

In general terms, the adapting in step S106 is made such that the emission in the direction towards the radio communication site 160 is not completely switched off.

In general terms, the adapting in step S106 is made during normal operation of the base station 140.

In general terms, the adaptation in step S106 pertains to any part of the beamformed transmission that needs to be adapted; main lobe, side lobe(s), or back lobe(s). The herein disclosed embodiments are not limited in this respect. That is, the emission from the base station 140 in the direction towards the radio communication site 160 that contributes within the operating radio frequency band of the radio communication site 160 could be either in the main lobe of the beamformed transmission, in one or more side lobes of the beamformed transmission, and/or in one or more back lobes of the beamformed transmission. Thus, although the communication site 160 is located in the direction of the main lobe of the beamformed transmission 150*b* in FIG. 1, this needs not to be the case. Further, the beamformed transmission 150*b* might be adapted to be at a safety margin from the prescribed limit so as to reduce the risk of exceeding the prescribed limit and to allow for other changes to occur in the communications network 100 without needing to again adapt the beamformed transmission 150*b*.

Embodiments relating to further details of adapting beamformed transmission 150*b* from a base station 140 as performed by the control node 200 will now be disclosed.

There may be different ways for the control node 200 to obtain the first piece of information in step S102. In some aspects the distance and direction are given by absolute or relative coordinates. Thus, according to an embodiment, the first piece of information is provided as absolute or relative geographical coordinates of the radio communication site 160. In some aspects the distance and direction are obtained by scanning the environment, by making table look up, or by the control node 200 obtaining information from sensors, unmanned aerial vehicles, or other sources of external information. In particular, according to an embodiment, the first piece of information is obtained by at least one of: radio scanning a surrounding of the base station 140, accessing a database 190 storing the first piece of information, and obtaining the first piece of information as external information.

In further details, the actual geographical coordinates of the base station 140 and the communication site 160 and/or the relative direction there between could be obtained from a database 190, from map information, by means of actual compliance measurements (such as radio scanning the surrounding of the base station 140) when the base station 140 is deployed, or by external information, etc. This could enable dynamic adaptation of the beamformed transmission.

In terms of geographical coordinates of the base station 140, this information could be added together with antenna height and sector directions of the base station 140 when the base station 140 is deployed. In terms of geographical coordinates of the communication site 160, this information is in some aspect considered known to the mobile network operator of the base station 140 as the mobile network operator has to fulfill requirements not to interfere to adjacent systems (such as the communication site 160). This information could include also the antenna height of the communication site 160.

In terms of external information, it might be required to perform compliance testing of the base station 140 before allowing the base station 140 to operate in the field. The radiated field in the direction of the communication site 160 can be measured (by the vehicle) and from that also the geographical coordinates of the communication site 160 will be known—assuming that the communication site 160 is transmitting radio waves that the vehicle is capable of measuring. Additionally or alternatively, sensor(s) could be installed in a protection zone in order to monitor transmission from the base station 140. The sensor might be configured to provide feedback relating to possible emission in the protection zone to the base station 140, including the geographical coordinates of the sensor itself. The controller 200 is thereby made aware of the emission from the base station 140 in the protection zone and can use this information when adapting the beamformed transmission from the base station 140. In further examples, the sensor(s) could be either active or passive. The sensor(s) could be active in the sense to provide feedback to the network node 200 such that unwanted emission can be avoided in the direction of the sensor(s). The sensor(s) could be passive, like with a reflector, in the sense that the base station 140 might itself measure on reflected signals if it is calibrated in order to determine any possible unwanted emission in the direction of the sensor(s).

In terms of radio scanning, the base station 140 might be configured to scan its radio environment and thus use beamformed interference discovery for communication sites 160 transmitting radio waves to find any direction where beamformed transmission from the base station 140 should be adapted.

Further, the base station 140 might be configured to issue a notification if environmental changes (such as weather conditions) cause the base station 140 to physically move or otherwise cause the beam formed transmission to, in an uncontrolled manner, changes direction. This can be achieved by using gyroscopes or accelerometers at the base station 140 and collecting information from the gyroscopes or accelerometers. Such gyroscopes or accelerometers could be also used to calibrate the wanted and unwanted emission during operation of the base station 140.

In some aspects the emission from the base station 140 in the direction towards the radio communication site 160 that contributes within the operating radio frequency band of the radio communication site 160 is referred to as unwanted emissions. In general terms, the unwanted emissions comprise out-of-band emissions and spurious emissions. Out of band emissions are generally defined as unwanted emissions immediately outside the channel bandwidth resulting from the modulation process and non-linearity in the transmitter but excluding spurious emissions. Spurious emissions are generally defined as emissions which are caused by unwanted transmitter effects such as harmonics emission, parasitic emission, intermodulation products and frequency conversion products, but exclude out-of-band emissions, see 3GPP TS 36.104. In this, respect, the operating band of the radio communication site 160 might be at least partly outside the operating band of the base station 140 and still be affected by unwanted emissions from the base station 140. In particular, according to an embodiment, the base station 140 has its own operating radio frequency band, and the operating radio frequency band of the radio communication site 160 is at least partly outside the operating radio frequency band of the base station 140. As a non-limiting illustrative example, the base station 140 might be configured for transmission in the radio frequency band extending between 2620 MHz and 2690 MHz and the radio communication site 160 might be configured to operate in a radio frequency band extending between 2700 MHz and 3100 MHz. However, there might be spurious emissions from the base station 140 outside the operating radio frequency band. The beamformed transmission from the base station 140 might therefore be adapted to limit the emission e.g. in the frequency band extending between 2700 MHz to 2800 MHz.

There could be different ways for the control node 200 to perform the adapting in step S106.

In some aspects the adapting involves to estimate a default beamformed transmission 150*b* from the base station 140 in the operating band of, and in the direction towards, the radio communication site 160 and to adapt the default beamformed transmission 150*a* in order to fulfil requirements. Thus, according to an embodiment, the control node 200 is configured to perform (optional) step S106*a* as part of the adapting in step S106:

S106*a*: The control node 200 estimates the amount of emission contribution within the operating radio frequency band of the radio communication site 160 and in the direction towards the radio communication site 160 for a default beamformed transmission 150*a* from the base station 140. The default beamformed transmission 150*a* is then adapted in response to this estimating.

There could be different types of prescribed limits. According to an embodiment, the prescribed limit corresponds to maximum allowed effective isotropically radiated power (EIRP). In this respect the EIRP might be defined as the power fed to the antenna multiplied by the antenna realized gain, as disclosed in IEEE 145-2013—the IEEE Standard Definition of Terms for Antennas 2013.

In some aspects the adapting involves to determine the maximum allowed EIRP as a function of distance to the radio communication site 160 with respect to the maximum allowed interference level. Thus, according to an embodiment, the control node 200 is configured to perform (optional) step S106*b* as part of the adapting in step S106:

S106*b*: The control node 200 determines the maximum allowed EIRP as a function of the distance to the radio communication site 160 and a maximum allowed interference power density level at the radio communication site 160. The beamformed transmission 150*b* is then adapted according to the maximum allowed EIRP or interference power density. In this respect, the interference power density is the power density of the interference caused by the beamformed transmission 150*b* at the radio communication site 160.

In some aspects the adapting involves to obtain information about the unwanted emission beam gain. Thus, according to an embodiment, the control node 200 is configured to perform optional step S106*c* as part of the adapting in step S106:

S106c: The control node 200 obtains a third piece of information indicating emission from the base station 140 in the direction towards the radio communication site 160. The beamformed transmission 150b is then adapted according to the third piece of information.

There may be different ways for the control node 200 to obtain the third piece of information in step S106c. In some aspects the information obtained by making table look-up. Thus, according to an embodiment, the third piece of information is obtained by the control node 200 accessing a database 190. In some aspects the information is obtained by receiving feedback from terminal devices 170 and/or sensors/vehicles 180. Thus, according to an embodiment, the third piece of information is obtained by the base station 140 receiving feedback.

In some aspects where the third piece of information is obtained by the control node 200 accessing a database 190, the database 190 might store real antenna measurements as obtained during the design phase of the base station 140, during production of the base station 140, or from the base station 140 operating in the field. The antenna measurements might give a phase and amplitude relation for in-band component and out of band correlated components in order for the controller 200 to estimate the wanted and unwanted emission in a certain direction from the base station 140.

In some aspects where the third piece of information is obtained by receiving feedback from terminal devices 170 and/or sensors/vehicles 180, the terminal devices 170 and/or sensors/vehicles 180 can be configured to report back emission levels of the transmission beams from the base station 140 in different directions for in-band component as well as for out of band correlated components. Further in this respect, terminal devices 170 and/or sensors/vehicles 180 can be placed in the exclusion zone and configured to initiate network access, such as placing a call, to the base station 140. The terminal devices 170 and/or sensors/vehicles 180 could then measure the emission from the base station 140 (in-band component as well as out of band correlated components) in the exclusion zone and report back the measurements to the base station 140 or the database 190, thereby enabling the controller 200 to adapt the beamformed transmission such that unwanted emission in the exclusion zone is avoided, or at least limited.

There could be further different ways for the control node 200 to adapt the beamformed transmission 150b in step S106.

In some aspects the beamformed transmission 150b is adapted by power reduction only. Thus, according to an embodiment, the beamformed transmission 150b is associated with a default emission power level, and adapting the beamformed transmission 150b involves using an emission power level lower than the default emission power level. This could be the case where the accuracy of the unwanted beamformed emission cannot be estimated.

In some aspects the beamformed transmission 150b is adapted by the beam pattern being adapted. Thus, according to an embodiment, the beamformed transmission 150b is associated with a beam pattern having a default shape, and adapting the beamformed transmission 150b involves adapting the default shape of the beam pattern. Further in this respect, as disclosed above the database 190 might store antenna measurements that give a phase and amplitude relation for in-band component and out of band correlated components. This phase and amplitude relation might then be used when determining how to adapt the amplitude and phase coefficients (as defining the beamforming weights) of the beam pattern having the default shape so as to obtain the beam pattern having the thus adapted shape. The default shape of the beam pattern could also be adapted by application of adaptive spatial filtering at the base station 140.

In some aspects the beamformed transmission 150b is adapted by one or more beams being removed from the beam pattern. Thus, according to an embodiment, the beamformed transmission 150b is associated with using beams in a default set of beams, and adapting the beamformed transmission 150b involves removing any beam from the default set of beams that points in the direction towards the radio communication site 160. Hence, the beamforming weights might be unaltered for all transmission beams except for the thus removed beam, for which the beamforming weights are set to zero, resulting in null-steering.

In some aspects the beamformed transmission 150b is adapted by the number of transmitted resource blocks being limited. Thus, according to an embodiment, the beamformed transmission 150b is associated with transmitting a default number of resource blocks, and adapting the beamformed transmission 150b involves transmitting less than the default number of resource blocks.

Figure 3:
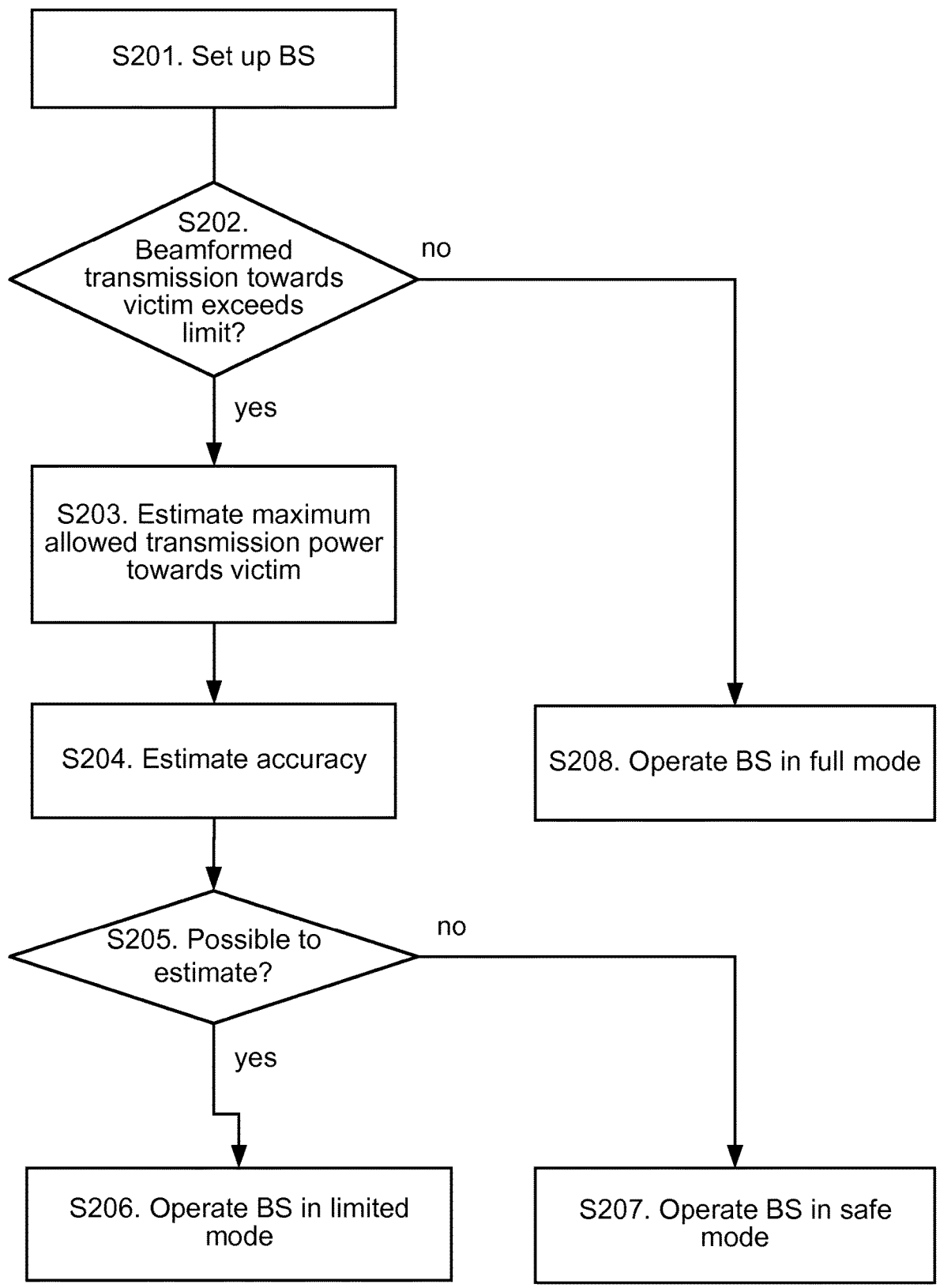

One particular embodiment for adapting beamformed transmission 150b from a base station 140 based on at least some of the above disclosed embodiments will now be described with reference to the flowchart of FIG. 3. Further, the features described in relation to FIG. 3 may be combined with any of the embodiments disclosed above, either in isolation or in combination with other features.

S201: The control node 200 sets up the base station 140. In this respect, the set up might comprise obtaining information about the geographical location and height of the base station 140 as well as information about the geographical location and height of the radio communication site 160. The set up might further comprise obtaining information about the operating radio frequency band of the base station 140 as well as information about the operating radio frequency band of the radio communication site 160. The set up might further comprise obtaining information about the prescribed limit representing the maximum level of emission for beamformed transmission from the base station 140 towards the radio communication site 160. The set up might further comprise obtaining environmental information, such as line of sight information, non-line of sight information, terrain information, weather conditions, etc.

S202: The control node 200 determines whether the beamformed transmission from the base station 140 towards the radio communication site 160 exceeds the prescribed limit. If yes, step S203 is entered, and if no, step S208 is entered.

S203: The control node 200 estimates the maximum allowed transmission power to be used by the base station 140 for transmission 140 towards the radio communication site 160 such that the beamformed transmission is within the prescribed limit. This could comprise adapting the beamformed transmission 150b so as to keep emission from the base station 140 in the direction towards the radio communication site 160 that contributes within the operating radio frequency band of the radio communication site 160 within the prescribed limit according to any of the embodiments disclosed above.

S204: The control node 200 estimates the accuracy of estimation of any unwanted emission caused by the beamformed transmission 150b being adapted in step S203. There could be different ways to estimate this accuracy. According to a first example the accuracy is estimated by comparing the estimation of any unwanted emission to a vendor's measurement margin. According to a second example the accuracy is estimated by comparing the estimation of any unwanted emission to a predefined sensor margin. According to a third example the accuracy is estimated by comparing the estimation of any unwanted emission to, e.g., real antenna measurements as obtained during a design phase of the base station 140.

S205: If the accuracy estimated in S204 is higher than a threshold value, step S206 is entered. If the accuracy is not higher than the threshold value, step S207 is entered.

S206: The control node 200 applies the beamformed transmission 150*b* as adapted in step S203. The base station 140 thereby operates in a limited mode.

S207: The control node 200 further adapts the beamformed transmission 150*b* so as to further limit the emission from the base station 140 in the direction towards the radio communication site 160 that contributes within the operating radio frequency band of the radio communication site 160. The base station 140 thereby operates in a safe mode.

S208: The control node 200 does not adapt the beamformed transmission 150*b* from the base station 140. The base station 140 thereby operates in full mode.

Any of the herein disclosed steps (i.e., S102-S106, as well as any of the optional steps S106*a*-S106*c* when performed, and S201-S207) might be repeatedly performed in order to on a regular basis monitor as to whether beamformed transmission from the base station 140 causes any unwanted emission for the radio communication site 160.

FIG. 4 at (a), (b), (c), and (d) shows four examples of beam patterns, in terms of EIRP as a function of spreading angle Φ (which could be either azimuth or elevation), for beamformed transmissions of different levels of beamforming. The beam pattern (a) uses the highest level of beamforming and the beam pattern (d) uses the lowest level of beamforming. In fact, the beam pattern (d) represents no beamforming at all.

FIG. 5 shows a plurality of realizations of the beam pattern (b) in FIG. 4, where the bold line 410 represents the beam pattern (b) in FIG. 4 and each thin line 420 represents one of the plurality of realizations.

Figure 6:
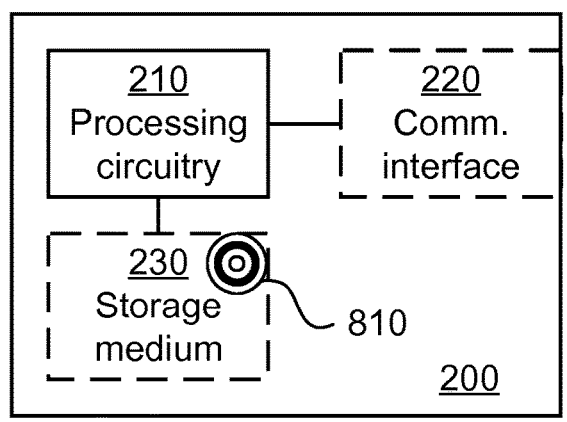
FIG. 6 is a schematic diagram showing functional units of a control node according to an embodiment.

FIG. 6 schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, actions, or steps, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control node 200 may further comprise a communications interface 220 at least configured for communications with other functions, entities, nodes, and devices of the communications network 100. As such the communications interface 220 may comprise one or more transmitters and receivers, comprising analogue and digital components. The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 7:
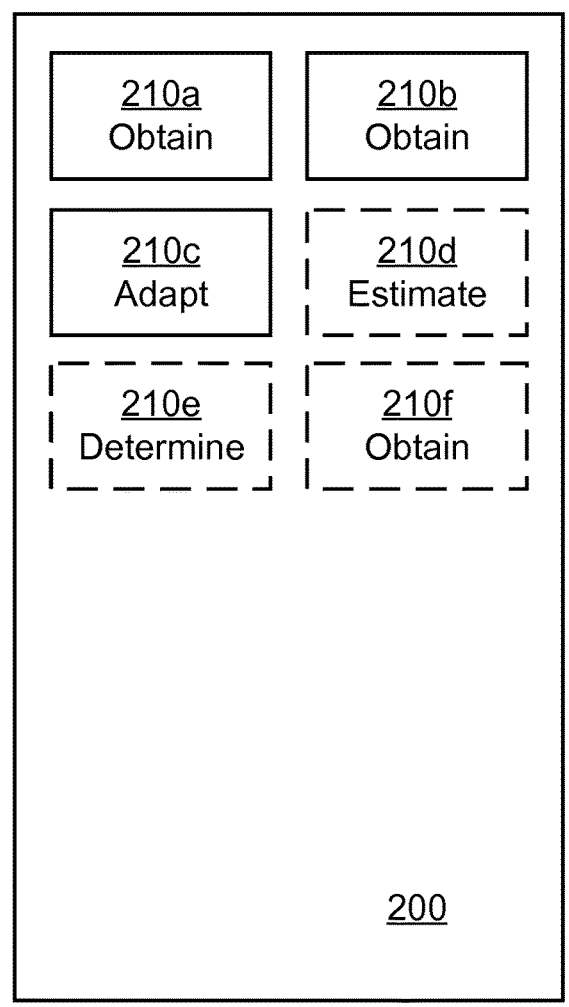
FIG. 7 is a schematic diagram showing functional modules of a control node according to an embodiment.

FIG. 7 schematically illustrates, in terms of a number of functional modules, the components of a control node 200 according to an embodiment. The control node 200 of FIG. 7 comprises a number of functional modules; an obtain module 210*a* configured to perform step S102, an obtain module 210*b* configured to perform step S104, and an adapt module 210*c* configured to perform step S106. The control node 200 of FIG. 7 may further comprise a number of optional functional modules, such as any of an estimate module 210*d* configured to perform step S106*a*, a determine module 210*e* configured to perform step S106*b*, and an obtain module 210*f* configured to perform step S106*c*. In general terms, each functional module 210*a*-210*f* may in one embodiment be implemented only in hardware and in another embodiment with the help of software, i.e., the latter embodiment having computer program instructions stored on the storage medium 230 which when run on the processing circuitry makes the control node 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210*a*-210*f* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*f* and to execute these instructions, thereby performing any steps as disclosed herein.

The control node 200 may be provided as a standalone device or as a part of at least one further device. For example, the control node 200 may be provided in a node of the radio access network (such as in the base station 140) or in a node of the core network. Alternatively, functionality of the control node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 6 the processing circuitry 210 may be distributed among a plurality of devices, or nodes. The same applies to the functional modules 210a-210f of FIG. 7 and the computer program 820 of FIG. 8.

Figure 8:
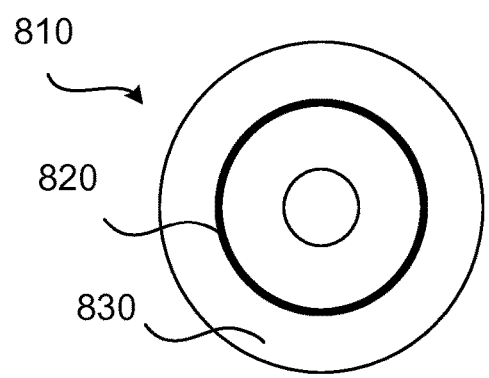
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

Figure 9:
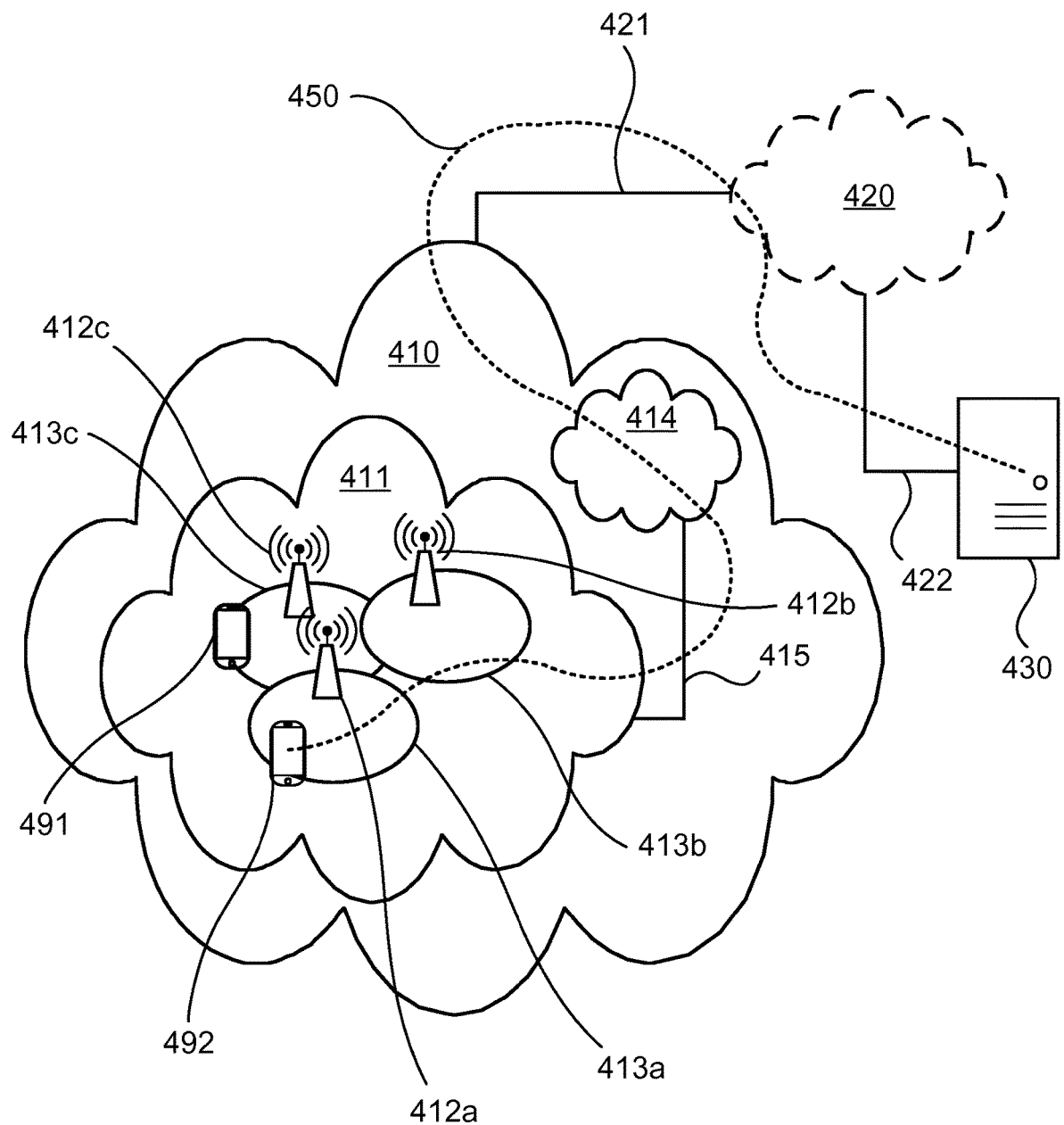
FIG. 9 is a schematic diagram illustrating a telecommunication network connected via an intermediate network to a host computer in accordance with some embodiments.

FIG. 9 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 2. Access network 411 comprises a plurality of network nodes 412a, 412b, 412c, such as NBs, eNBs, gNBs (each corresponding to the base station 140 of FIG. 1) or other types of wireless access points, each defining a corresponding coverage area, or cell, 413a, 413b, 413c. Each network node 412a, 412b, 412c is connectable to core network 414 over a wired or wireless connection 415. A first terminal device 491 located in coverage area 413c is configured to wirelessly connect to, or be paged by, the corresponding network node 412c. A second terminal device 492 in coverage area 413a is wirelessly connectable to the corresponding network node 412a. While a plurality of terminal devices 491, 492 are illustrated in this example, the disclosed embodiments are equally applicable to a situation where a sole terminal device is in the coverage area or where a sole terminal device is connecting to the corresponding network node 412. The terminal devices 491, 492 correspond to the terminal device 170 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected terminal devices 491, 492 and host computer 430. The connectivity may be described as an over- the-top (OTT) connection 450. Host computer 430 and the connected terminal devices 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected terminal device 491. Similarly, network node 412 need not be aware of the future routing of an outgoing uplink communication originating from the terminal device 491 towards the host computer 430.

Figure 10:
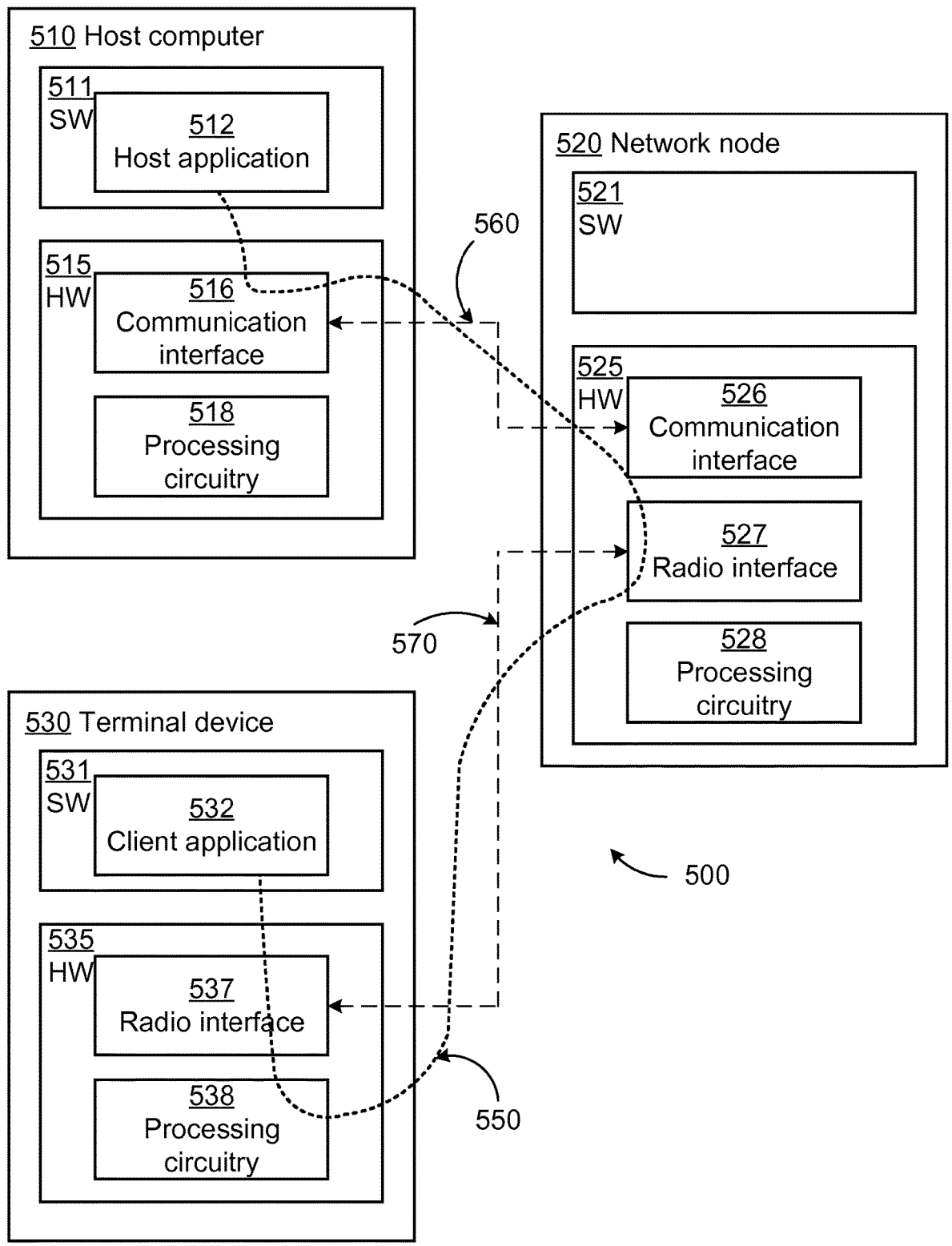
FIG. 10 is a schematic diagram illustrating host computer communicating via a network node with a terminal device over a partially wireless connection in accordance with some embodiments.

FIG. 10 is a schematic diagram illustrating host computer communicating via a network node with a terminal device over a partially wireless connection in accordance with some embodiments. Example implementations, in accordance with an embodiment, of the terminal device, network node and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as terminal device 530 connecting via OTT connection 550 terminating at terminal device 530 and host computer 510. The terminal device 530 corresponds to the terminal device 140 of FIG. 1. In providing the service to the remote user, host application 512 may provide user data which is transmitted using OTT connection 550.

Communication system 500 further includes network node 520 provided in a telecommunication system and comprising hardware 525 enabling it to communicate with host computer 510 and with terminal device 530. The network node 520 corresponds to the base station 140 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with terminal device 530 located in a coverage area (not shown in FIG. 10) served by network node 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of network node 520 further includes processing circuitry 528, which may comprise one or more programmable processors, application-specific integrated circuits, field programmable gate arrays or combinations of these (not shown) adapted to execute instructions. Network node 520 further has software 521 stored internally or accessible via an external connection.

Communication system 500 further includes terminal device 530 already referred to. Its hardware 535 may include radio interface 537 configured to set up and maintain wireless connection 570 with a network node serving a coverage area in which terminal device 530 is currently located. Hardware 535 of terminal device 530 further includes processing circuitry 538, which may comprise one or more programmable processors, application-specific integrated circuits, field programmable gate arrays or combinations of these (not shown) adapted to execute instructions. Terminal device 530 further comprises software 531, which is stored in or accessible by terminal device 530 and executable by processing circuitry 538. Software 531 includes client application 532. Client application 532 may be operable to provide a service to a human or non-human user via terminal device 530, with the support of host computer 510. In host computer 510, an executing host application 512 may communicate with the executing client application 532 via OTT connection 550 terminating at terminal device 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, network node 520 and terminal device 530 illustrated in FIG. 10 may be similar or identical to host computer 430, one of network nodes 412a, 412b, 412c and one of terminal devices 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and terminal device 530 via network node 520, without explicit reference to any intermediary devices and the precise routing of messages via these devices. Network infrastructure may determine the routing, which it may be configured to hide from terminal device 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between terminal device 530 and network node 520 is in accordance with the teachings of the embodiments described throughout this disclosure. One or more of the various embodiments improve the performance of OTT services provided to terminal device 530 using OTT connection 550, in which wireless connection 570 forms the last segment. More precisely, the teachings of these embodiments may reduce interference, due to improved classification ability of airborne terminal devices which can generate significant interference.

A measurement procedure may be provided for the purpose of monitoring data rate, latency and other factors on which the one or more embodiments improve. There may further be an optional network functionality for reconfiguring OTT connection 550 between host computer 510 and terminal device 530, in response to variations in the measurement results. The measurement procedure and/or the network functionality for reconfiguring OTT connection 550 may be implemented in software 511 and hardware 515 of host computer 510 or in software 531 and hardware 535 of terminal device 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to network node 520. Such procedures and functionalities may be known and practiced in the art. In certain embodiments, measurements may involve proprietary terminal device signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adapting beamformed transmission from a base station, wherein the beamformed transmission creates interference at a radio communication site, the method being performed by a control node, wherein the control node is configured to control the beamformed transmission, the method comprising:
    obtaining a first piece of information indicative of distance to, and direction towards, the radio communication site relative the base station;
    obtaining a second piece of information indicative of operating radio frequency band of the radio communication site; and
    reducing the interference at the radio communication site, wherein the base station does not provide network access to the radio communication site, and reducing the interference at the radio communication site comprises adapting the beamformed transmission so as to keep emission from the base station in the direction towards the radio communication site that contributes within the operating radio frequency band of the radio communication site within a prescribed limit.

2. The method of claim 1, wherein the first piece of information is provided as absolute or relative geographical coordinates of the radio communication site.

3. The method of claim 1, wherein the first piece of information is obtained by at least one of: radio scanning a surrounding of the base station, accessing a database storing the first piece of information, and obtaining the first piece of information as external information.

4. The method of claim 1, wherein the base station has its own operating radio frequency band, and wherein the operating radio frequency band of the radio communication site is at least partly outside the operating radio frequency band of the base station.

5. The method of claim 1, wherein the adapting further comprises:
estimating amount of emission contribution within the operating radio frequency band of the radio communication site and in the direction towards the radio communication site for a default beamformed transmission from the base station, and wherein it is the default beamformed transmission that is adapted in response to said estimating.

6. The method of claim 1, wherein the prescribed limit corresponds to maximum allowed effective isotropically radiated power (EIRP).

7. The method of claim 6, wherein the adapting further comprises:
determining the maximum allowed EIRP as a function of the distance to the radio communication site and a maximum allowed interference power density level at the radio communication site, and wherein the beamformed transmission is adapted according to the maximum allowed EIRP or interference power density.

8. The method of claim 1, wherein the adapting further comprises:
obtaining a third piece of information indicating emission from the base station in the direction towards the radio communication site, and wherein the beamformed transmission is adapted according to the third piece of information.

9. The method of claim 8, wherein the third piece of information is obtained by the control node accessing a database.

10. The method of claim 8, wherein the third piece of information is obtained by the base station receiving feedback.

11. The method of claim 1, wherein the beamformed transmission is associated with a default emission power level, and wherein adapting the beamformed transmission involves using an emission power level lower than the default emission power level.

12. The method of claim 1, wherein the beamformed transmission is associated with a beam pattern having a default shape, and wherein adapting the beamformed transmission involves adapting the default shape of the beam pattern.

13. The method of claim 1, wherein the beamformed transmission is associated with using beams in a default set of beams, and wherein adapting the beamformed transmission involves removing any beam from the default set of beams that points in the direction towards the radio communication site.

14. The method of claim 1, wherein the beamformed transmission is associated with transmitting a default number of resource blocks, and wherein adapting the beamformed transmission involves transmitting less than the default number of resource blocks.

15. The method of claim 1, wherein the base station serves terminal devices in a radio access network, and wherein the beamformed transmission is device-specific for one of the terminal devices.

16. The method of claim 1, wherein the beamformed transmission is emitted from an adaptive antenna system, or a multiple input multiple output antenna system, of the base station.

17. The method of claim 1, wherein the radio communication site is any of: a radar station, a radio astronomy station, or an earth satellite ground station.

18. A control node for adapting beamformed transmission from a base station, wherein the beamformed transmission creates interference at a radio communication site, the control node being configured to control the beamformed transmission and comprising processing circuitry, the processing circuitry being configured to cause the control node to:
obtain a first piece of information indicative of distance to, and direction towards, the radio communication site relative the base station;
obtain a second piece of information indicative of operating radio frequency band of the radio communication site; and
reduce the interference at the radio communication site, wherein the base station does not provide network access to the radio communication site, and to reduce the interference at the radio communication site comprises to adapt the beamformed transmission so as to keep emission from the base station in the direction towards the radio communication site that contributes within the operating radio frequency band of the radio communication site within a prescribed limit.

19. A computer program product comprising a non-transitory computer readable medium storing a computer program for adapting beamformed transmission from a base station, wherein the beamformed transmission creates interference at a radio communication site, the computer program comprising computer code which, when run on processing circuitry of a control node being configured to control the beamformed transmission, causes the control node to:
obtain a first piece of information indicative of distance to, and direction towards, the radio communication site relative the base station;
obtain a second piece of information indicative of operating radio frequency band of the radio communication site; and
reduce the interference at the radio communication site, wherein the base station does not provide network access to the radio communication site, and to reduce the interference at the radio communication site comprises to adapt the beamformed transmission so as to keep emission from the base station in the direction towards the radio communication site that contributes within the operating radio frequency band of the radio communication site within a prescribed limit.

* * * * *